June 20, 1939.  G. R. DEMPSTER  2,162,839
TRANSPORTING AND DUMPING VEHICLE
Filed Jan. 17, 1938  3 Sheets-Sheet 1

Inventor
George R. Dempster
By Cameron, Kerkam + Sutton
Attorneys

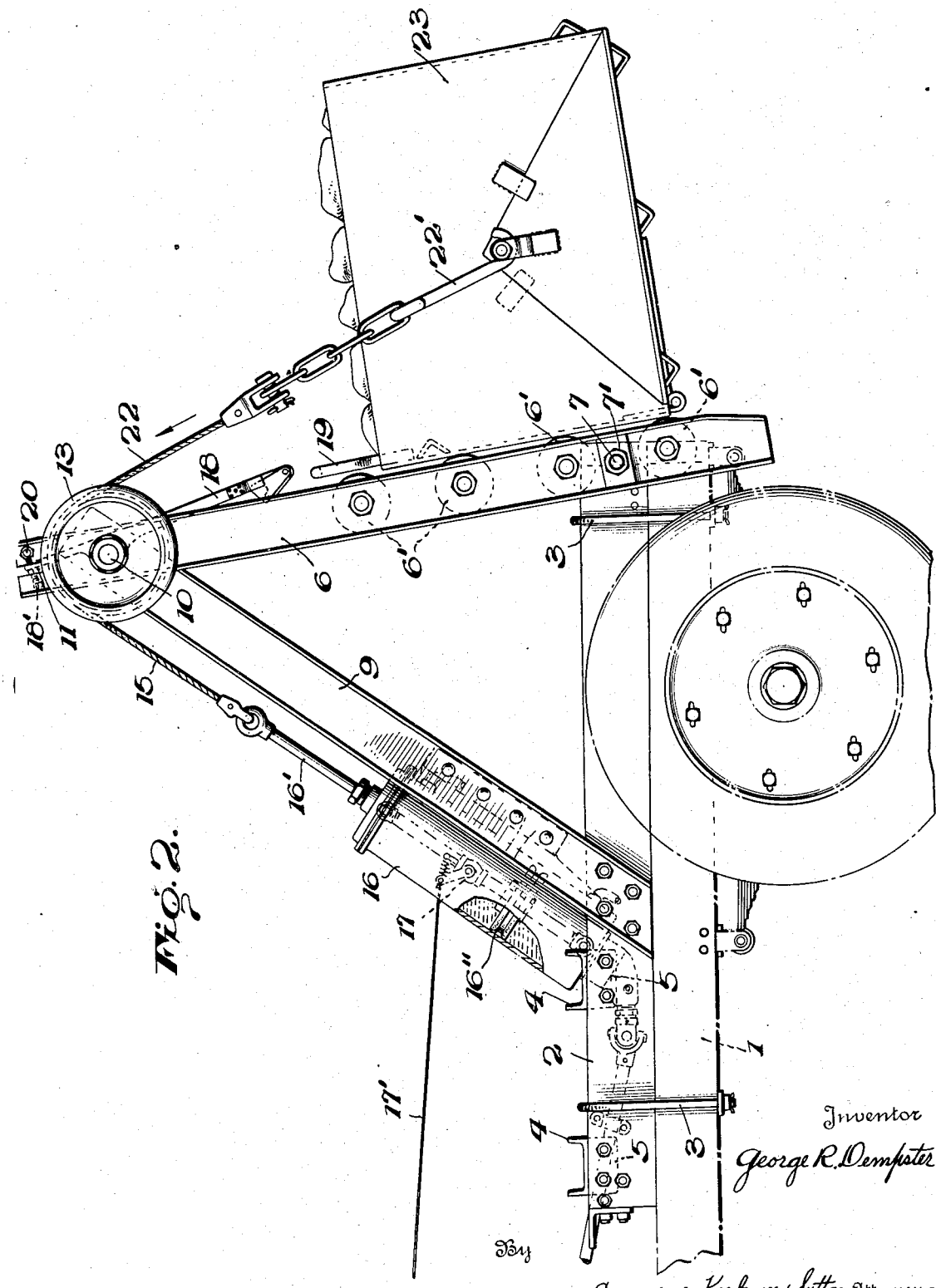

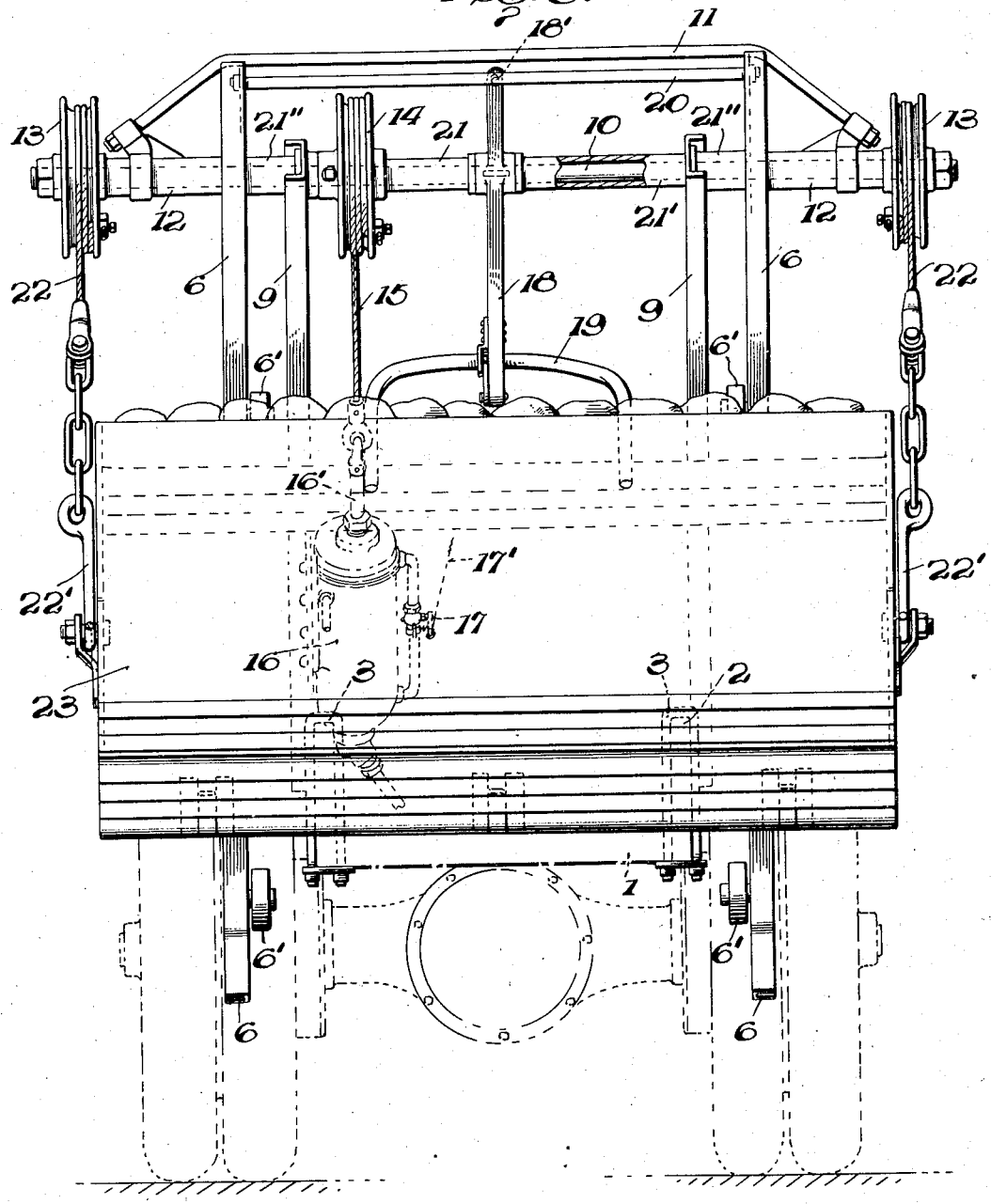

Patented June 20, 1939

2,162,839

UNITED STATES PATENT OFFICE 2,162,839

TRANSPORTING AND DUMPING VEHICLE

George R. Dempster, Knoxville, Tenn.

Application January 17, 1938, Serial No. 185,419

3 Claims. (Cl. 214—100)

This invention relates to transporting and dumping vehicles and has for its object to produce a device of this character of simple construction, effective in operation, and the parts of which are capable of being compactly arranged in knock-down position for shipment.

The inventive idea is capable of receiving a variety of mechanical expressions, one of which for the purpose of illustrating the invention is shown in the accompanying drawings, but it is to be expressly understood that such drawings are for the purpose of illustration only, and are not designed to define the limits of the invention, reference being had to the appended claims for this purpose. In said drawings—

Fig. 2 is a side elevation with the container in a position slightly below its elevated or top position; and Fig. 3 is an end elevation of Fig. 1.

Figure 1:
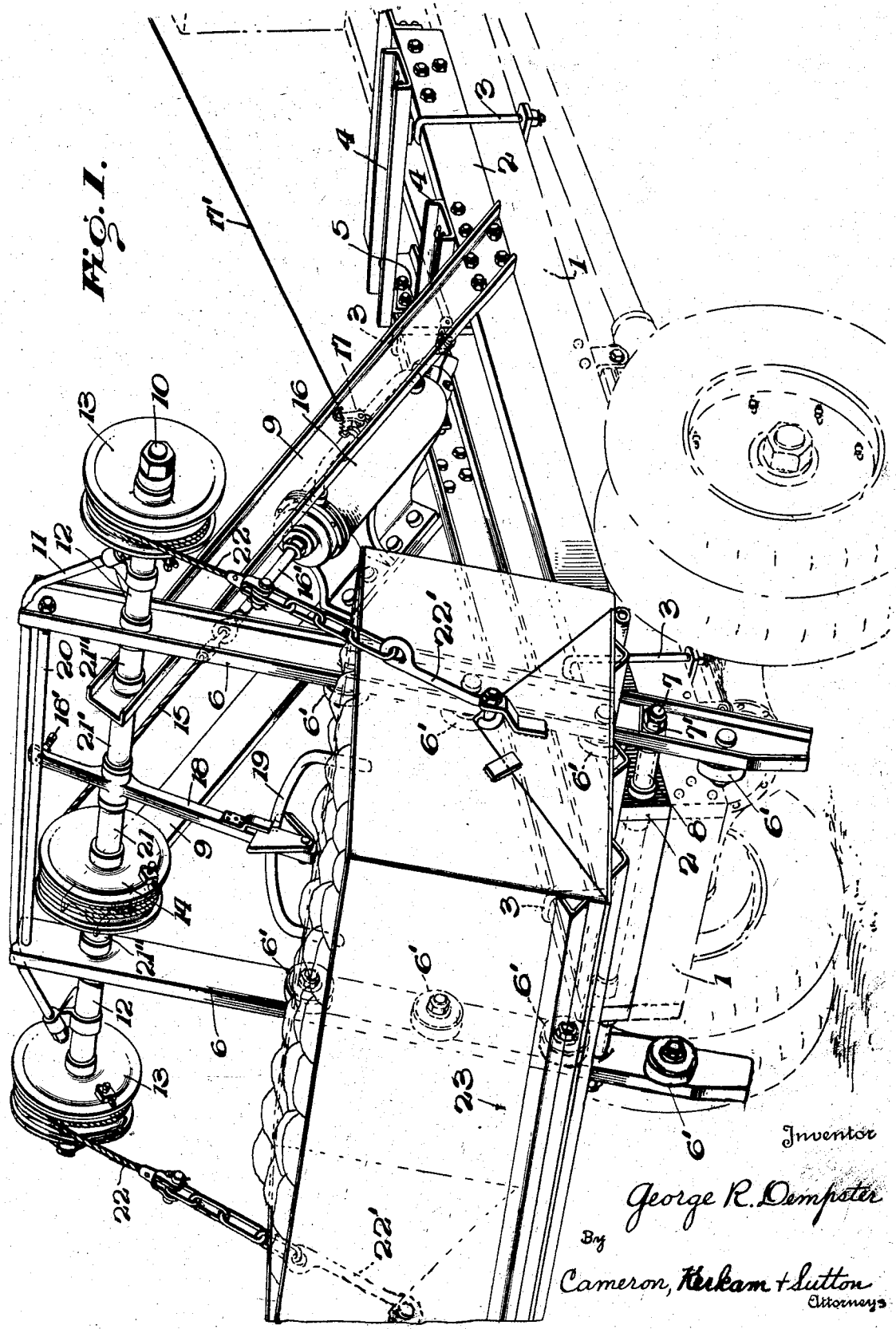
Fig. 1 is a perspective view of one form which the invention may assume, with the container shown in elevated position.

In said drawings, in which like reference numerals indicate like parts throughout the several views, 1—1 are side frame bars of the chassis of a truck, and 2—2 indicate base bars suitably secured to the frame bars 1 by any suitable means as by clamps 3—3. These base bars are suitably spaced by spacing elements 4 provided with downwardly extending brackets 5, by means of which they are bolted to the base bars 2. By providing space bars 4 of varying lengths, base bars 2 may be suitably spaced to conform to the spacing of frame bars 1—1 of different vehicles.

An upwardly extending track or way, preferably slightly inclined, is provided with rails 6—6 which, if desired, may be provided with anti-friction rollers 6'—6'. The rails 6—6 are secured at their lower ends to the rear ends of the base bars 2—2 by means of a rod 7 extending across and through the rails and base bars, the rails being spaced from the base bars 2 by means of sectional tubing 8 extending between the inner face of each rail and the outer face of each base bar with a clamping nut 7' (Fig. 1) holding each rail into intimate contact with the sectional tubing.

9—9 are brace bars, the lower ends of which are suitably secured, as by bolts, to the base bars 2—2, the upper ends of which brace bars extend to a point between the rails 2—2, as clearly shown in Figs. 1 and 3. A shaft 10 (Fig. 3) extends from side to side of the structure with its ends projecting outside of the rails 6—6 of the track or way and turns in bearings on the rails of the track or way and on the upper ends of the brace bars 9—9. As here shown, said bearings are formed in the rails of the track or way and in the brace bars, said shaft extending through the rails of the track or way and through the brace bars. A truss rod 11 extends across the extreme upper end of the rails 6—6 with its outer ends deflected downward where said ends are engaged by collars 12—12 on the shaft 10. Mounted on the outer ends of the shaft 10 and fixed thereto are two drums 13—13 which drums are spaced from the rails 6—6 by the collars 12—12. These drums being fixed to the shaft 10, revolve therewith, as will be more fully explained hereafter. Fixed on the shaft 10 between the rails 6—6 is a third drum 14 having a cable 15 wound thereon and with one end fixed thereto, the other end of the cable 15 being connected to a suitable power device here shown as a cylinder 16, mounted between the bars 9—9, and as here shown connected to one of said rails by suitable supports, and preferably having the lower end thereof supported on one of the cross bars 4. As here shown this cylinder has substantially the same angle of inclination as the brace bars 9, and the piston rod 16' thereof is connected to the end of the cable 15. The piston 16'' (Fig. 2) is actuated by any suitable fluid under pressure which, if desired, may be supplied by the engine of the truck. This fluid pressure is directed to one or the other side of the piston 16'' by means of a valve 17 (Fig. 2), controlled by a line or rod 17' extending to the driver's seat. As the specific construction of this power device forms no part of the present invention, it need not be described further than to say that any power device capable of applying power to the cable 15 may be employed.

Mounted to turn on the shaft 10 is any suitable catch 18 in position to engage a part of the container to hold the same in elevated position during transportation by engaging a suitable part of the container, as for example, a bail 19 rigidly secured to the back wall of the container. This swinging catch 18 is provided with means, as an adjusting screw 18', engaging a rod 20 extending across between the rails 6—6, to the end that the catch may be held in suitable position to be engaged by the bail 19 as the container reaches its elevated position. The specific construction of the catch and its means of adjustment form no part of the present invention and need not be further described. This catch 18 is spaced from the drum 14 by suitable tubular section 21 on the shaft 10 and spaced from one of the brace bars 9 by a similar tubular section 21' on said shaft 10. Likewise, the brace bars 9 are spaced from the rails 6—6 by tubular sections 21".

Wound on the drums 13—13 and with one end secured thereto are cables 22—22, the free ends of which are provided with suitable means as hooks 22' for engaging lugs on the ends of the container 23, which container as here shown is of the bottom dump variety, but it is to be expressly understood that the invention is not limited to any particular form of container or any particular method of dumping the same, the container here shown being merely used for the purpose of illustration.

In operation when the container is on the ground the hooks 22' are engaged with the lugs on the ends of the container, and the shaft 10 is revolved by moving the piston in the cylinder 16 inward. The revolution of the shaft 10 serves to revolve the drums 13—13 and wind up cables 22—22 thereon, thus elevating the container to a position where it is engaged by the catch 18, which position is the one it occupies in transporting from point to point.

It will be observed that by reason of the ability to adjust the base bars 2—2 to any desired width and fix the same by means of the space bars 4, such bars can be spaced so as to conform to the spacing between the bars 1—1 of the truck, and by suitable spacing of the upper ends of the brace bars 9—9 by means of the tubular section 21', 21" they may be suitably spaced from the rails 6—6. Furthermore, by reason of the fact that the shaft 10 passes through the rails 6—6 and brace bars 9—9, no riveting or bolting is required to enable the brace bars to effectively perform their function. Furthermore, by removing the drums 13—13 and releasing the drum 14 and the shaft 10, the same may be withdrawn, thus permitting the rails 6—6 to be turned downward parallel with the base bars 2—2 and the brace bars 9 can also be placed in a line with the base bars 2 by simply removing the bolts securing the lower ends thereof to said base bars. This permits the entire structure other than the container to be placed in compact position for shipment. It will be seen that the entire structure consists of a minimum number of parts readily assembled by unskilled labor, and is one of great strength and effective operation.

Having thus described the invention, what is claimed is:

1. In a transporting and dumping vehicle, the combination of an upwardly extending track or way, a shaft extending across the upper portion of said track or way and with its ends projecting out beyond the said track or way, drums keyed to the projecting ends of said shaft, a container movable up and down on said track or way, flexible connections passing around said drums and engaging said container, brace bars engaging said shaft, means spacing the ends of said brace bars along said shaft, base bars secured to the lower ends of the brace bars and pivoted to the lower end of said track or way, means securing said base bars to the vehicle frame, a third drum keyed to said shaft intermediate the rails of the track or way, a power device mounted on and between said brace bars and a cable connected to said power device and extending around said third drum.

2. The combination of a pair of parallel base bars, a pair of upwradly extending rails constituting a track or way, means pivoting the lower ends of said rails to and outside of the said base bars, a pair of brace bars, means connecting the lower ends of said brace bars to said base bars, a shaft passing through the upper ends of said rails and the upper ends of said brace bars with the ends of said shaft projecting outside of said rails, drums keyed to said projecting ends, a container, cables wound on said drums, means connecting one end of each of said cables to said container, a third drum keyed to said shaft between said rails, a cable wound on said third drum, and a power device supported on and between said brace bars and connected to the cable on said third drum.

3. In a transporting and dumping vehicle, the combination of a pair of base bars, means securing said base bars to a vehicle frame, a pair of upwardly extending rails constituting a track or way, means pivoting the lower ends of said rails to the base bars, a pair of brace bars, means connecting the lower ends of said brace bars to the base bars, a shaft passing through the upper ends of said rails and brace bars, power means revolving said shaft, a container, and means operated by said shaft to move the container along said track or way.

GEORGE R. DEMPSTER.